US011986126B1

(12) United States Patent
Klein

(10) Patent No.: US 11,986,126 B1
(45) Date of Patent: May 21, 2024

(54) CHAFING DISH

(71) Applicant: Green Crown Ventures LLC, Brooklyn, NY (US)

(72) Inventor: Lauren Klein, Toms River, NJ (US)

( * ) Notice: Subject to any disclaimer, the term of this patent is extended or adjusted under 35 U.S.C. 154(b) by 0 days.

(21) Appl. No.: 18/244,115

(22) Filed: Sep. 8, 2023

(51) Int. Cl.
*A47J 36/34* (2006.01)
*A47J 36/24* (2006.01)
*A47J 37/07* (2006.01)

(52) U.S. Cl.
CPC ............... *A47J 36/34* (2013.01); *A47J 36/24* (2013.01); *A47J 36/2405* (2013.01); *A47J 2037/0777* (2013.01)

(58) Field of Classification Search
CPC ........ A47J 36/24; A47J 36/2405; A47J 36/34; A47J 2037/0777; A47J 43/18; A47J 37/0694; A47J 36/22; A47J 36/20
USPC .................................................. 248/153, 175
See application file for complete search history.

(56) References Cited

U.S. PATENT DOCUMENTS

| | | | | |
|---|---|---|---|---|
| 918,656 A | * | 4/1909 | Chase ...................... | A47J 27/04 126/369 |
| 1,612,937 A | * | 1/1927 | Mitchell .................. | A47F 5/13 248/150 |
| 2,101,487 A | * | 12/1937 | Anderson ............. | A47J 37/108 211/74 |
| 2,593,077 A | * | 4/1952 | Vogt ........................ | A47J 43/18 248/176.1 |
| 3,199,438 A | * | 8/1965 | Myler .................... | A47J 37/041 99/450 |
| 3,972,318 A | * | 8/1976 | Lenoir ..................... | A47J 37/10 D7/354 |
| 4,200,040 A | * | 4/1980 | MacRae .................. | A47J 43/18 294/169 |

(Continued)

FOREIGN PATENT DOCUMENTS

| | | | |
|---|---|---|---|
| CN | 2735200 Y | 10/2005 | |
| CN | 102204777 A | * 10/2011 | .......... A47J 36/2405 |

(Continued)

OTHER PUBLICATIONS

Amazon.com: Sterno Party Pack Buffet Kit, 1-Pack, 8 pieces, Aluminum: Home & Kitchen. (May 10, 2011). Amazon. Retrieved Dec. 1, 2023, from https://www.amazon.com/Sterno-70182-Full-Size-Buffet/dp/B0030E8GB8 (Year: 2011).*

*Primary Examiner* — Taylor Morris

(57) ABSTRACT

A collapsible chafer stand for heating food is disclosed. The chafer stand includes a base frame. The chafer stand includes leg frames placed apart from one another. The leg frames connect at distal ends of the base frame via T-shaped members. The chafer stand includes poles extending from distal ends of each leg frame. The chafer stand includes a top frame removably connected to the poles. The top frame includes pole receiving sections. The pole receiving sections receive the poles and connect the top frame to the base frame. The poles are connected via a straight connecting bar and handle. The top frame receives a tray having a dish. The base frame receives a heating member for chafing the dish. The top frame is removed and the poles are made to collapse over the base frame when not in use. The chafing stand provides an easily stackable structure that can be folded for easy transportation.

6 Claims, 7 Drawing Sheets

(56) References Cited

U.S. PATENT DOCUMENTS

| | | | |
|---|---|---|---|
| 4,648,379 A * | 3/1987 | Fordyce | A47J 37/0694 99/426 |
| 4,718,402 A | 1/1988 | Fordyce | |
| 5,287,800 A * | 2/1994 | Orednick | A47J 33/00 99/449 |
| 6,131,560 A * | 10/2000 | Healy | A47J 37/0763 126/30 |
| 6,234,068 B1 * | 5/2001 | Sherman | A47J 36/2477 99/449 |
| 6,575,337 B1 * | 6/2003 | Malavear | A47J 36/34 248/141 |
| 6,705,210 B2 * | 3/2004 | Leonard | A47J 43/287 220/573.1 |
| 6,955,327 B1 | 10/2005 | Skvorecz | |
| D626,377 S | 11/2010 | Contreras | |
| 7,828,160 B2 | 11/2010 | Lin | |
| 7,954,772 B2 | 6/2011 | Skvorecz | |
| 8,434,729 B2 * | 5/2013 | McConnell | A47J 36/06 220/573.1 |
| 8,561,957 B2 * | 10/2013 | Levine | A47J 36/34 220/573.1 |
| 9,155,422 B1 * | 10/2015 | Wohld | A47J 43/18 |
| 9,414,712 B2 | 8/2016 | Skvorecz | |
| 9,517,858 B2 | 12/2016 | Skvorecz | |
| D807,116 S | 1/2018 | Fariello | |
| 9,861,228 B1 | 1/2018 | Fariello | |
| D821,811 S | 7/2018 | Schiller | |
| D852,582 S | 7/2019 | Skvorecz | |
| 2003/0034318 A1 | 2/2003 | Skvorecz | |
| 2005/0167381 A1 | 8/2005 | Fariello | |
| 2011/0147559 A1 * | 6/2011 | McConnell | A47J 36/04 248/346.03 |
| 2018/0168394 A1 * | 6/2018 | Casternovia | A47J 36/022 |
| 2018/0289210 A1 * | 10/2018 | Skvorecz | A47J 36/34 |
| 2022/0039604 A1 * | 2/2022 | Skvorecz | A47J 37/0694 |
| 2023/0200585 A1 * | 6/2023 | Skvorecz | A47J 36/2405 248/153 |

FOREIGN PATENT DOCUMENTS

| | | | | |
|---|---|---|---|---|
| CN | 106580117 A | * | 4/2017 | A47J 36/34 |
| CN | 111759187 A | * | 10/2020 | A47J 37/0786 |
| DE | 202005012370 U1 | * | 3/2006 | A47J 37/0763 |
| KR | 200389623 Y1 | * | 7/2005 | A47J 37/0736 |
| KR | 20080006575 U | * | 12/2008 | A47J 37/0786 |
| KR | 20100027297 A | * | 3/2010 | A47J 37/0763 |
| KR | 20160086601 A | * | 7/2016 | A47J 37/07 |
| KR | 102252652 B1 | * | 5/2021 | A47J 36/34 |
| WO | WO-2007044660 A2 | * | 4/2007 | A47B 23/00 |
| WO | WO-2014030991 A1 | * | 2/2014 | A47J 36/22 |
| WO | WO-2016100409 A1 | * | 6/2016 | A47J 36/24 |

* cited by examiner

CHAFING DISH

FIELD OF THE INVENTION

The present invention relates generally to racks or stands. More specifically, the present invention relates to a collapsible chafer stand or rack for warming food.

BACKGROUND OF THE INVENTION

It is known that a chafing rack or chafing stand is commonly used for holding and heating food. A typical chafing stand includes an open structure made of metal to support a metal pan, which holds a chafing dish. The chafing stand further includes a support structure at the bottom to receive a heater for heating the chafing dish.

Several chafing stands have been disclosed in the past. One such example is disclosed in a United States Publication No. 20050167381, entitled "Folding rack for chafing dish" ("the '381 Publication"). The '381 Publication discloses a folding chafing dish rack having a locking mechanism between the legs which prevents the inadvertent collapse of the rack when in use. The device is easily assembled and stable when in use and folds into a compact package which can be efficiently stored.

Another example is disclosed in a U.S. Pat. No. 9,861,228, entitled "Structurally efficient, reduced material folding stand for a chafing dish" ("the '228 Patent"). The '228 Patent discloses a collapsible chafing dish stand includes a rim that holds the chafing dish pan; a first leg formed into a first geometric shape having two ends each pivotally coupled to the rim; a second leg similarly formed with two ends each pivotally coupled to the rim; a first cross bar and a second cross bar each formed into a select geometric shape, and pivotally coupled to the first leg and the second leg, respectively; and a hook to releasably couple the first cross bar to the second cross bar to secure the first and second legs in a support position. The improved configuration permits manufacture of a stand with fewer wire bends, simplified hinges and hook, simplified coupling of cross bars, and simplified geometric shapes, all of which combine to minimise material usage, and be more economically producible in a highly competitive marketplace, while retaining structural integrity.

Yet another example is disclosed in a U.S. Pat. No. 9,414,712, entitled "Compactly stackable wire chafing stand" ("the '712 Patent"). The '712 Patent discloses a wire stand having an upper rim of a closed rectangle and a lower rim of wire metal of similar, but smaller shape. The stand is nestable such that angled wires extending between the upper and lower rim touch each other when nested and the upper rims of the nested stands are held close to each other. The upper and lower rims are connected by at least two wires substantially identically shaped and bent with each wire being unitary and having a segment thereof attached to the upper rim and extending outwardly therefrom to form a handle element for the chafer wire stand. Each wire is attached to the lower rim and extends therefrom to form two supporting legs for the chafer wire stand.

Although the above discussed disclosures are useful, they have few problems. For instance, the existing chafing stands have bulky handles that interfere with the fuel holder. Further, the existing chafing stands have a nestable wire frame, which is not easy to collapse and put back in place.

Therefore, there is a need in the art to provide an improved collapsible chafer rack or stand for chafing a dish.

SUMMARY

It is an object of the present disclosure to provide a collapsible chafer stand that avoids the drawbacks of known chafer stands.

It is another object of the present disclosure to provide a collapsible chafer stand or foldable tray holder that is easily stackable.

It is another object of the present disclosure to provide a collapsible chafer stand to have a sleeker base frame that does interfere with a heating member used for chafing a dish.

In order to overcome one or more objects, the present disclosure presents a collapsible chafer stand for chafing a dish. The chafer stand includes a base frame. The chafer stand includes leg frames placed apart from one another. The leg frames connect to the base frame at distal ends of the base frame via T-shaped members. The chafer stand includes poles extending from distal ends of each leg frame. The chafer stand includes a top frame removably connected to the poles. Further, the top frame includes pole receiving sections. The pole receiving sections receive the poles and connect the top frame to the base frame. The top frame receives a tray having a dish. The base frame receives a heating member for heating the dish. The top frame is removed and the poles are made to collapse/fold over the base frame when not in use.

In one aspect, the leg frame includes a first section, U-shaped members, and second sections. The first section draws through the T-shaped member. The U-shaped members extend from distal ends of the first section. Here, the U-shaped members extend downwardly from the first section and act as base legs for the first frame. Each second section of the second sections extends from each U-shaped member.

In one advantageous feature of the present disclosure, the chafing stand provides an easily stackable structure that can be folded for easy transportation and reduced shipping costs by shipping the item in a smaller box.

In another advantageous feature of the present disclosure, the base frame is a single rod which is sleeker and does not interfere with the heating member, when compared with known base frames having additional bars.

In another advantageous feature of the present disclosure, the T-shaped member acts as a hinge member allowing the leg frames to pivot easily for folding.

The features and advantages of the disclosure here will become more apparent in light of the following detailed description of selected embodiments, as illustrated in the accompanying FIGURES. As will be realised, the disclosure disclosed is capable of modifications in various respects, all without departing from the scope of the disclosure. Accordingly, the drawings and the description are to be regarded as illustrative in nature.

BRIEF DESCRIPTION OF THE DRAWINGS

A more complete understanding of the invention and the many attendant advantages thereof will be readily appreciated as the same becomes better understood by reference to the following detailed description, when considered in connection with the accompanying drawings wherein.

DETAILED DESCRIPTION

Figure 1:
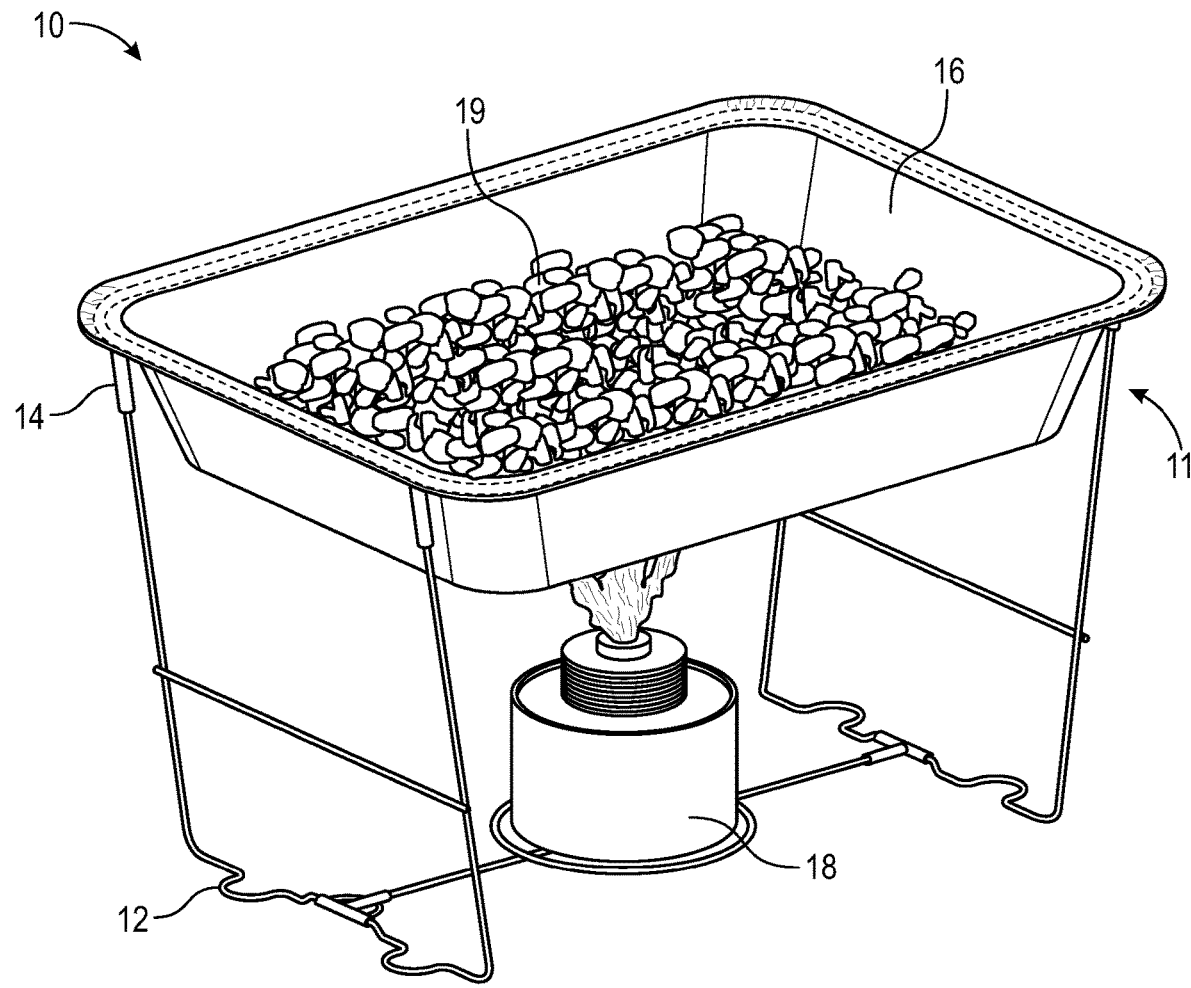
FIG. 1 illustrates an environment in which a chafing stand implements, in accordance with one embodiment of the present disclosure.

The following detailed description set forth below in connection with the appended drawings is intended as a description of exemplary embodiments in which the presently disclosed disclosure may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed chafing stand. However, it will be apparent to those skilled in the art that the presently disclosed disclosure may be practiced without these specific details. In some instances, well-known structures and devices are shown in functional or conceptual diagram form in order to avoid obscuring the concepts of the presently disclosed chafing stand.

In the present specification, an embodiment showing a singular component should not be considered limiting. Rather, the disclosure preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present disclosure encompasses present and future known equivalents to the known components referred to herein by way of illustration.

Although the present disclosure provides a description of a chafing stand, it is to be further understood that numerous changes may arise in the details of the embodiments of the chafing stand. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

The present disclosure discloses a collapsible chafer stand for heating food. The chafer stand includes a base frame. The chafer stand includes leg frames placed apart from one another. The leg frames connect to the base frame at distal ends of the base frame via T-shaped members. The chafer stand includes poles extending from distal ends of each leg frame. The chafer stand includes a top frame removably connected to the poles. The top frame receives a tray having a dish. The base frame receives a heating member for chafing the dish. The top frame is removed and the poles are made to collapse over the base frame when not in use.

Various features and embodiments of a collapsible chafing stand are explained in conjunction with the description of FIGS. 1-8.

Figure 2:
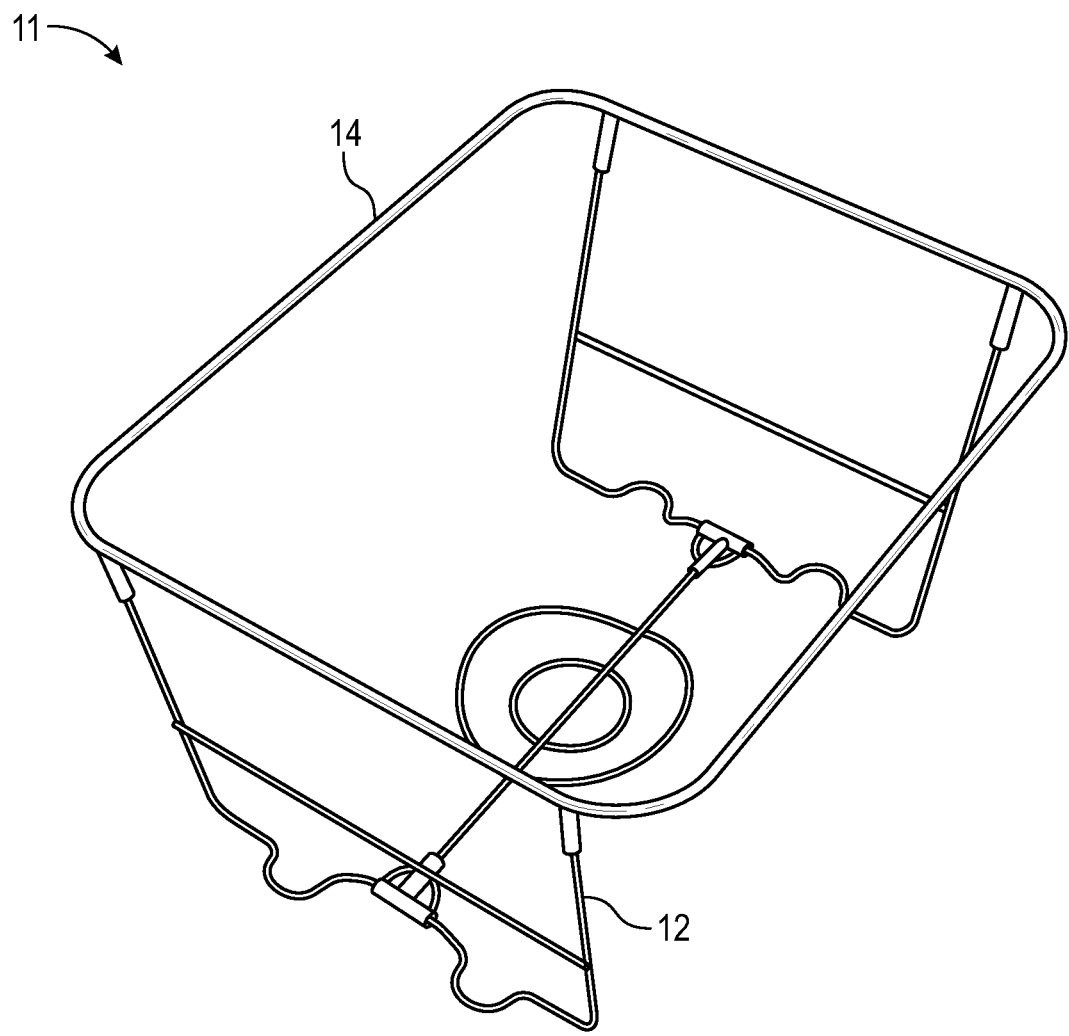
FIG. 2 illustrates the chafing stand having a first frame and a second frame, in accordance with one embodiment of the present disclosure.

FIG. 1 shows an environment 10 in which a collapsible chafing stand 11 implements, in accordance with one embodiment of the present invention. In the following description, the terms "collapsible chafing stand" and "chafing stand" are used interchangeably. Further, FIG. 2 shows a perspective view of chafing stand 11, in accordance with one embodiment of the present invention. Chafing stand 11 includes a first frame 12 and a second frame 14. First frame indicates a bottom frame and second frame 14 indicates a top frame positioned over first frame 12. Second frame 14 receives a tray or metal pan 16 that holds a chafing dish 19, as shown in FIG. 1. Here, dish 19 indicates a food item that requires heating. First frame 12 supports second frame 14 to rest at a height from a surface. Further, first frame 12 receives a heating member or heater or fuel holder 18 for heating the dish 19.

Figure 3A:
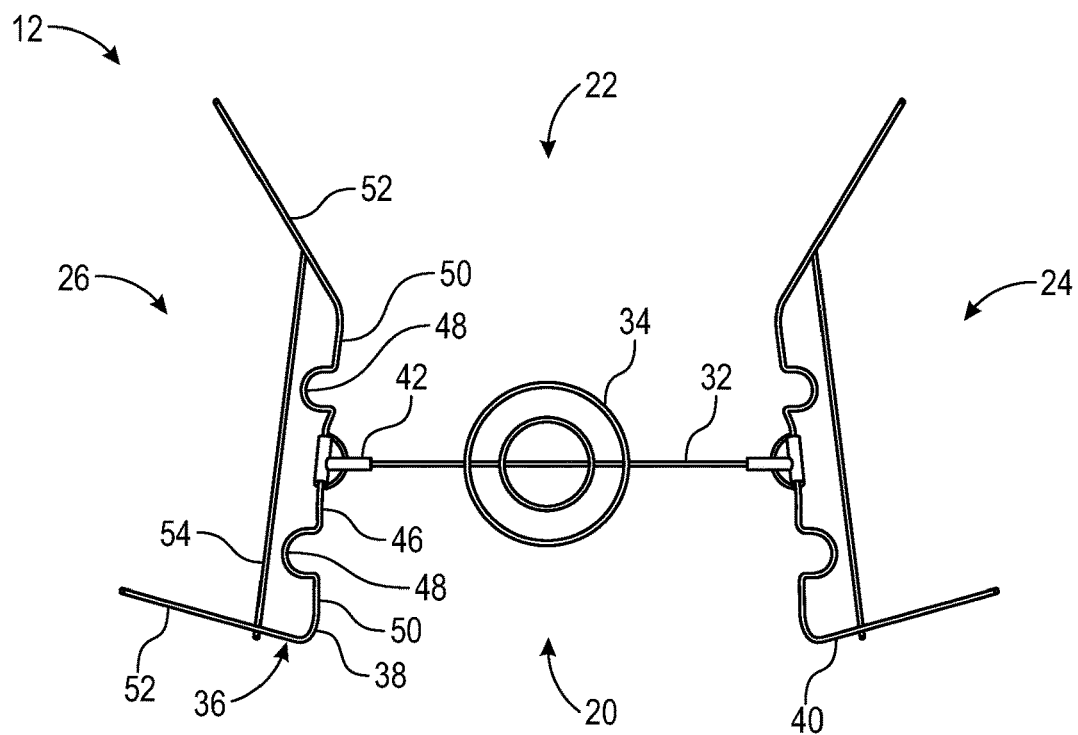
FIGS. 3A, 3B and 3C illustrate a top perspective view, a bottom perspective view and a side perspective view, respectively of the first frame, in accordance with one embodiment of the present disclosure.
Figure 3B:
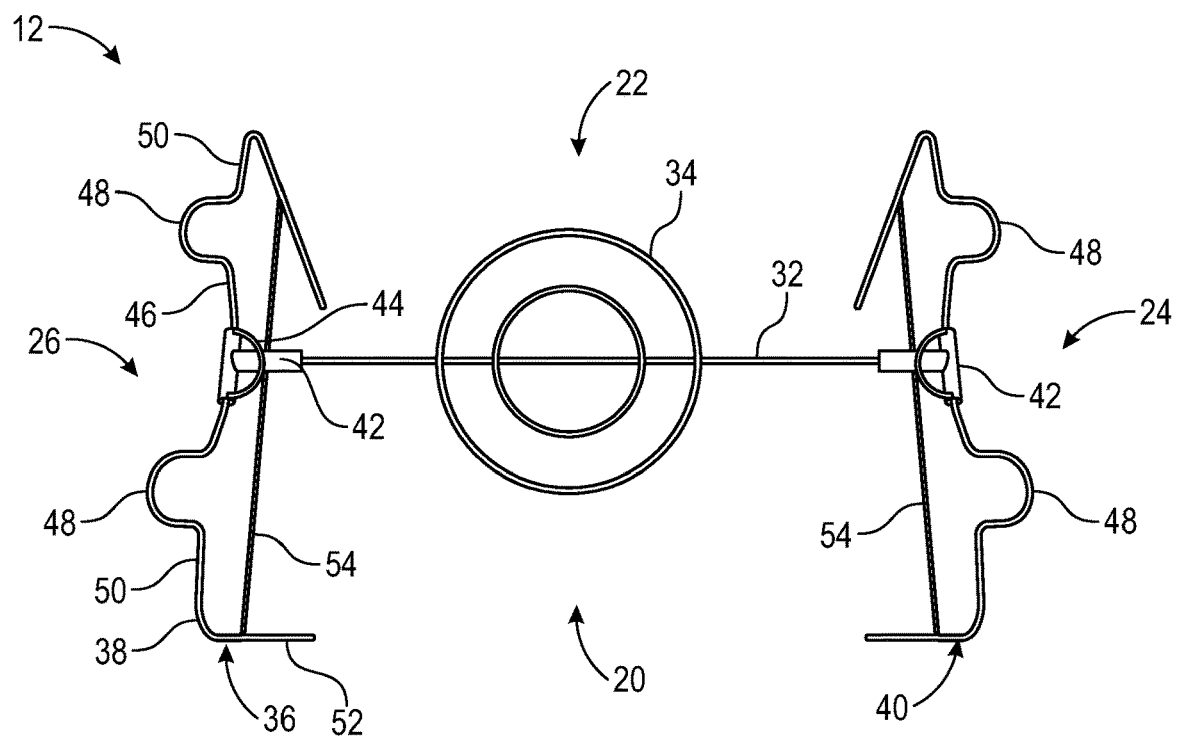
Figure 3C:
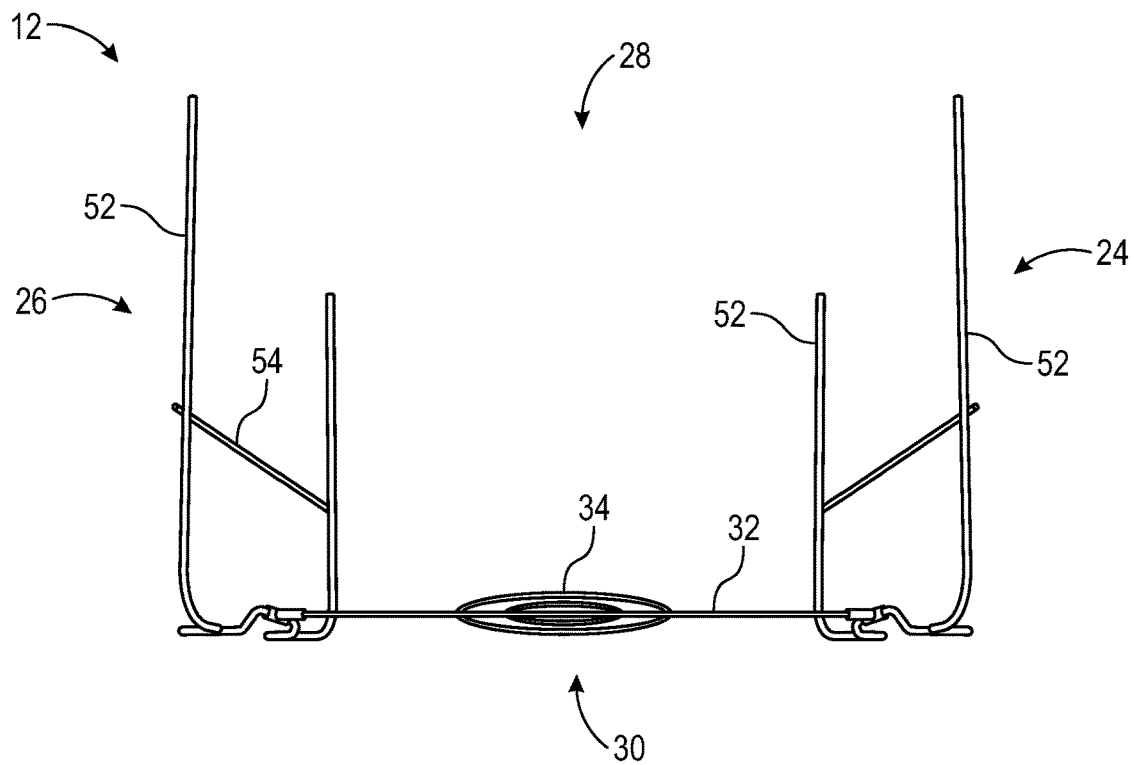
Figure 4:
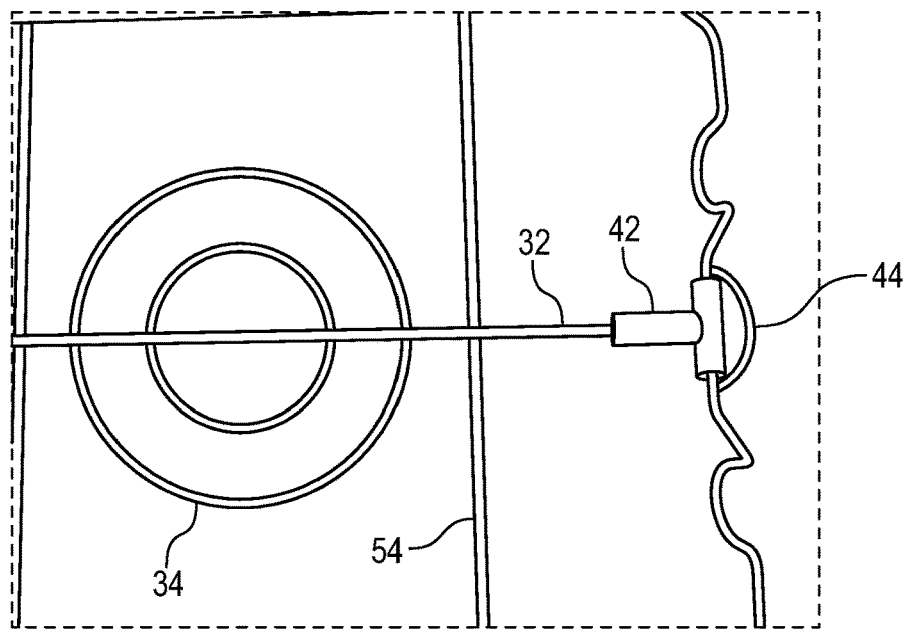
FIG. 4 illustrates a base frame of the first frame, in accordance with one embodiment of the present disclosure.

FIGS. 3A, 3B and 3C show a top perspective view, a bottom perspective view and a side perspective view, respectively of first frame 12, in accordance with one embodiment of the present invention. First frame 12 is made of a metal wire, hard plastic, wood or any other suitable material. First frame 12 comes in a U-shaped configuration as shown in at least FIG. 3. First frame 12 has a first end 20 and a second end 22. First end 20 indicates a front end and second end 22 indicates a rear end, or vice versa of first frame 12. Further, first frame 12 includes a first side 24 and a second side 26. First side 24 indicates a right side and second side 26 indicates a left side, or vice versa of first frame 12. Further, first frame 12 has a top end 28 and a bottom end 30.

First frame 12 includes a base frame 32. Base frame 32 indicates a rod positioned horizontally with respect to a surface, such as a floor or table, for example. Base frame 32 includes a heater support member 34. Heater support member 34 comes in a circular or coil-like structure and helps to place heating member 18 over it for heating dish 19 in tray 16.

Further, first frame 12 includes a pair of leg frames 36. Leg frames 36 include a first leg frame 38 and a second leg frame 40, placed apart from each other. First leg frame 38 and second leg frame 40 connect by base frame 32 with support from T-shaped members 42. In the present embodiment, base frame 32 connects a T-shaped member 42 at each of its distal ends. Each T-shaped member 42, i.e., T-shaped member 42 at second side 26 receives first leg frame 38 and T-shaped member 42 at first side 24 receives second leg frame 40, as shown in at least FIG. 3A. In one implementation, leg frame 36 includes a ring member 44. Ring member 44 comes in an O-ring or D-ring shape. Here, ring member 44 acts as a stop to the further extension of t-shaped member 42 when opening the first frame 12 into an open position. Ring member 44 further supports first frame 12 when in an open position.

Each of first leg frame 38 and second leg frame 40 includes a first section 46. First section 46 indicates a cylindrical wire that draws through T-shaped member 42 as shown in at least FIGS. 3B and 4. First section 46 includes U-shaped members 48. U-shaped members 48 extend down from both sides of first section 46. U-shaped members 48 rest over the surface and act as base legs for first frame 12. As U-shaped members 48 extend downward, they create a space or gap such that base frame 32 and heater support member 34 can rest at a height from the surface without coming in contact with the surface. Further, each of first leg frame 38 and second leg frame 40 includes second sections 50. Section sections 50 extend from U-shaped members 48 at each side/end as shown in at least FIG. 3B. Further, each of first leg frame 38 and second leg frame 40 includes poles 52 extending from distal ends of section sections 50. It should be understood that each of first leg frame 38 and second leg frame 40 includes a pair of poles 52, each extending upwards (towards top end 28) from the distal ends of section sections 50. Specifically, poles 52 extend vertically i.e., 90 degrees with respect to second sections 50, as shown in at least FIG. 3C. Further, each of first leg frame 38 and second leg frame 40 includes a connecting bar and handle 54. Connecting bar and handle 54 connects poles 52 extending from opposite ends of section sections 50 and supports poles 52 remain in place, as shown in FIGS. 3A, 3B and 3C. Connection bars and handles 54 further act as handles for carrying/transporting first frame 12 and/or chafing stand 11

Figure 5A:
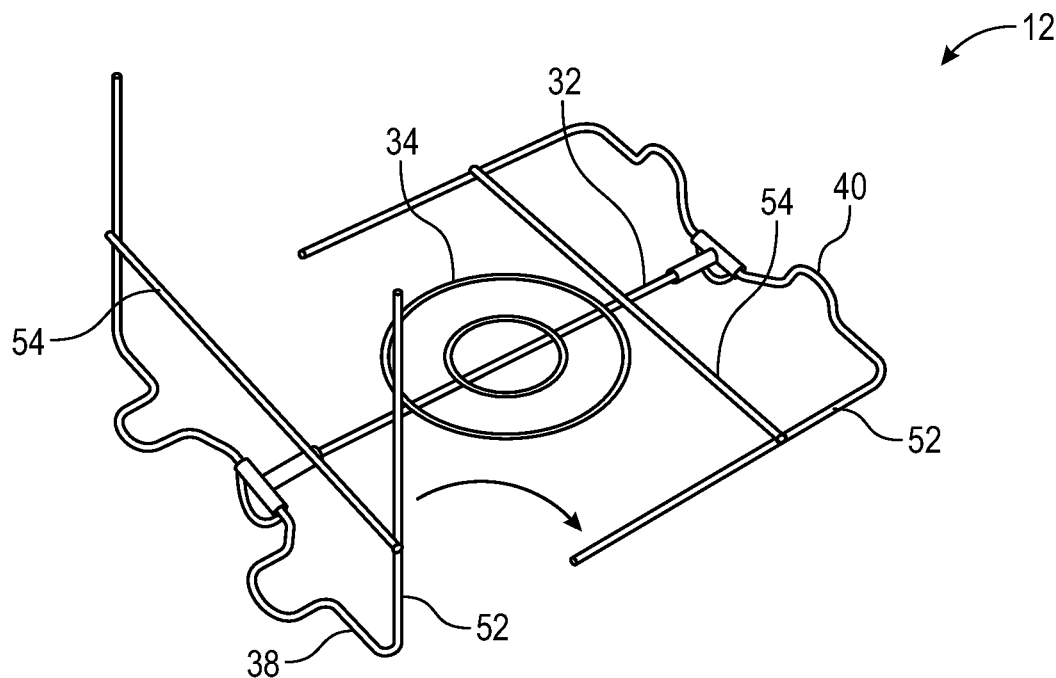
FIGS. 5A and 5B illustrate a side perspective view and a top perspective view, respectively of the first frame folding, in accordance with one embodiment of the present disclosure.
Figure 5B:
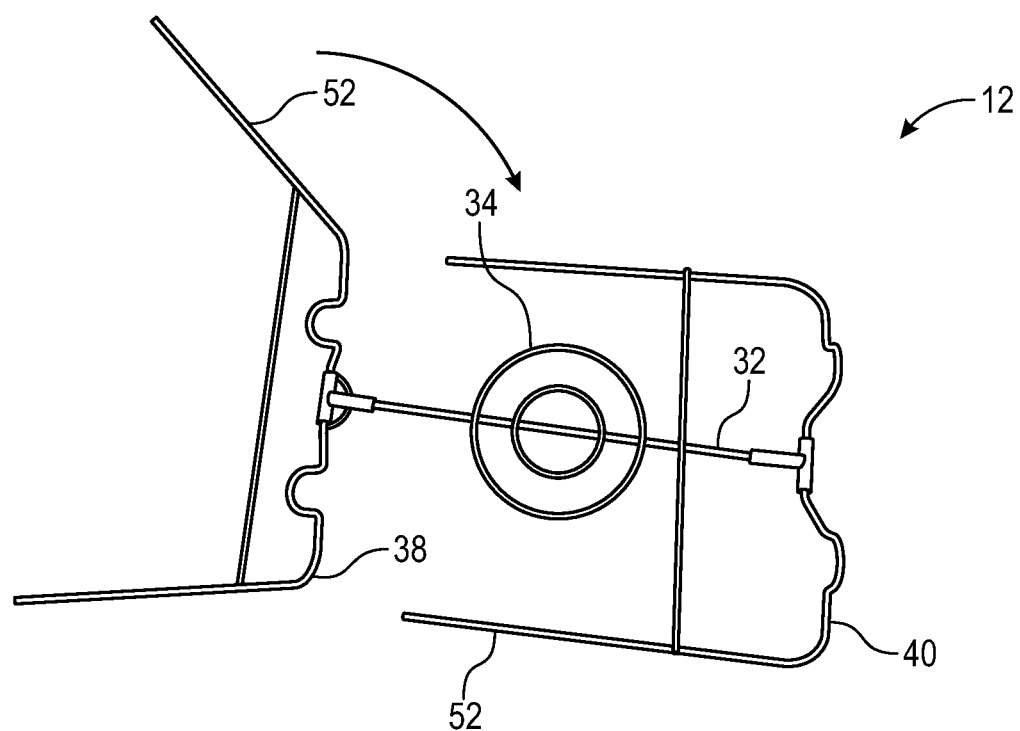
Figure 6:
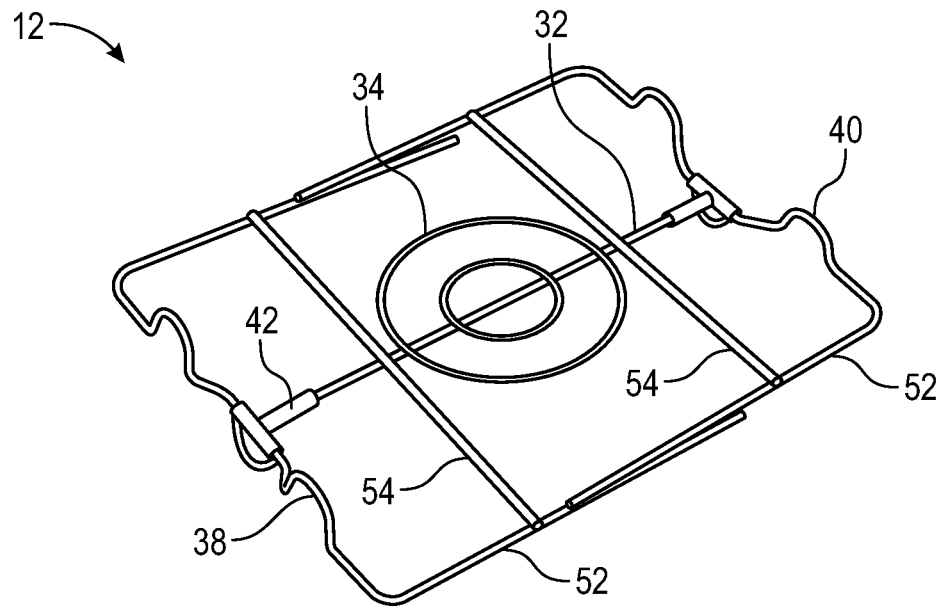
FIG. 6 illustrates the first frame in folding position, in accordance with one embodiment of the present disclosure.

In the present invention, each of first leg frame 38 and second leg frame 40 pivotably connects to base frame 32 via T-shaped frame 42. As such, poles 52 at each of first leg frame 38 and second leg frame 40 are collapsible to fold first frame 12. FIGS. 5A and 5B show the feature of poles 52 of first leg frame 38 positioned vertically and poles 52 of second leg frame 40 collapsed/folded over base frame 32. Subsequently, poles 52 of first leg frame 38 are folded over base frame 32, as shown in FIG. 6.

Figure 7:
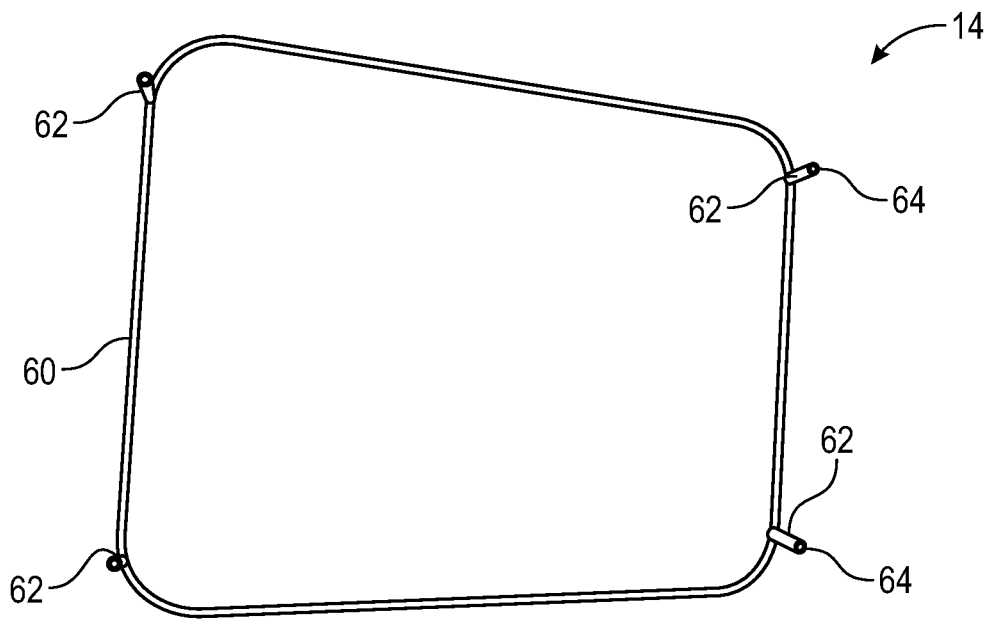
FIG. 7 illustrates a bottom perspective view of the second frame, in accordance with one embodiment of the present disclosure.
Figure 8:
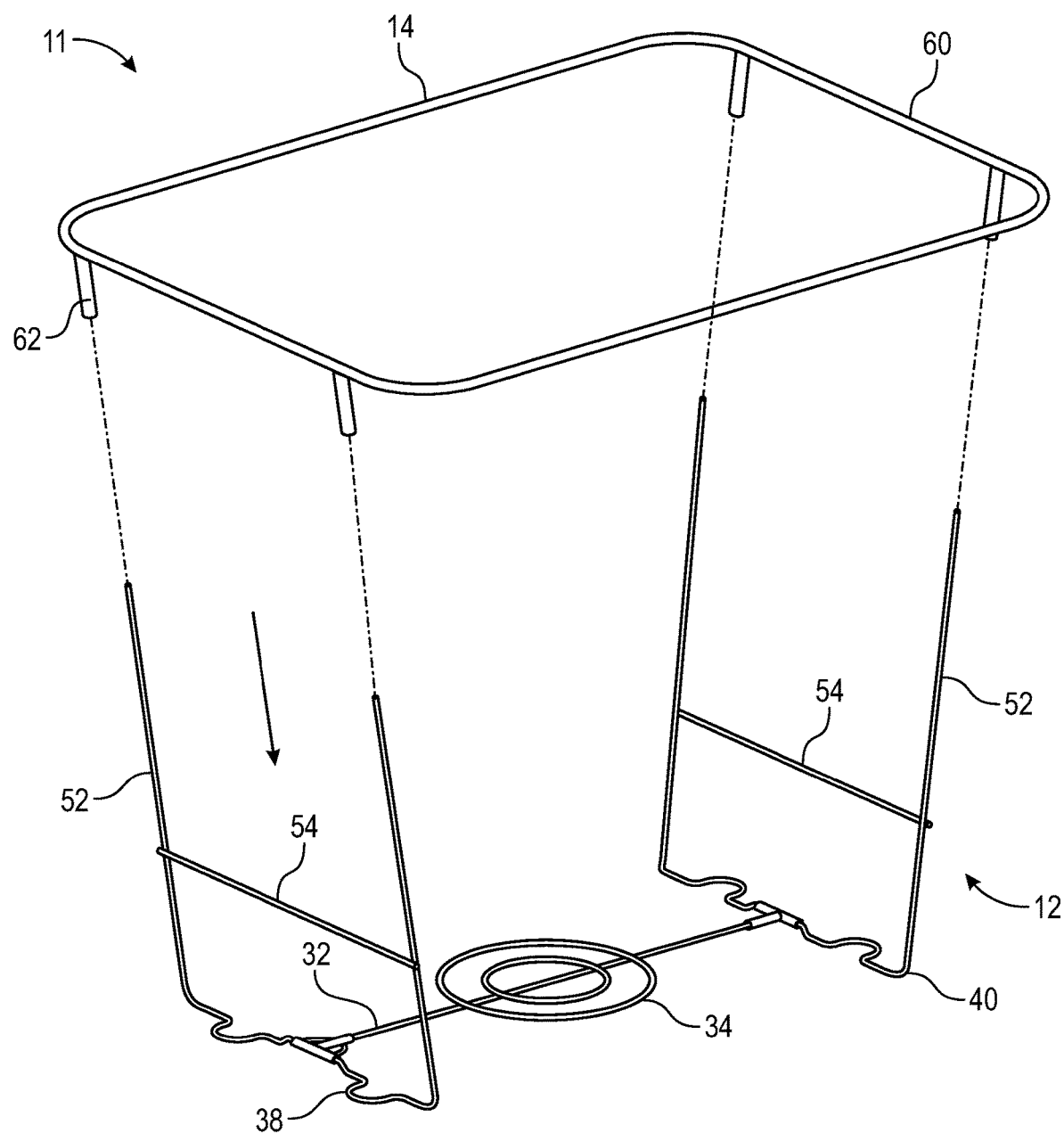
FIG. 8 illustrates an exploded view of the chafing stand, in accordance with another embodiment of the present disclosure.

FIG. 7 shows a bottom perspective view of second frame 14, in accordance with one embodiment of the present invention. As specified above, second frame 14 indicates a top frame. Second frame 14 indicates a rim that comes in a rectangular shape with curved edges. As can be seen, second frame 14 has an open structure to receive tray 16, which holds dish 19. Second frame 14 includes a plurality of pole receiving sections 62. Pole receiving sections 62 extend downwards i.e., towards bottom end 30. Each of pole receiving sections 62 include a hole 64 having a slightly larger diameter than pole 52 to receive it. FIG. 8 shows an exploded view of chafing stand 11 in which second frame 14 aligns with first frame 12, in accordance with one embodiment of the present invention. Here, pole receiving sections 62 align with poles 52. Subsequently, poles 52 insert in holes 64 and connect to second frame 14.

In order to use chafing stand 11, at first, base frame 32 is placed over the surface. Subsequently, poles 52 are positioned perpendicularly with respect to base frame 32. Further, second frame 14 is connected to poles 52 as shown in FIG. 2. Furthermore, tray 26 having dish 19 is placed within second frame 14, as shown in FIG. 1. Here, the weight of second frame 14 and/or tray 16 gets distributed across poles 52. In order to heat dish 19, heating member 18 is placed over heater support member 34.

After use, tray 16 is removed from second frame 14 and heating member 18 is removed from first frame 12. Further, second frame 14 is removed from poles 52. Furthermore, poles 52 are folded over first frame 12. In one example, ring members 44 act as a stop to the further extension of t-shaped members 42 when opening the first frame 12 into an open position. Ring member 44 further supports first frame 12 when in an open position. 11.

The presently disclosed chafing stand provides several advantages over prior art. For instance, the chafing stand is made of a wire metal with minimum connections making it easy to install and uninstall. Further, the base frame is a single rod, which is sleeker and does not interfere with the heating member, when compared with known base frames having additional bars. The T-shaped member acts as a hinge member allowing the leg frames to pivot easily for folding. Further, the T-shaped member keeps the chafing stand stable. The leg frames allow stacking the poles and the second frame without adding much weight to the overall structure. The connecting bar and handle is designed to minimize the folded size of the chafing stand for easier shipping and storage.

A person skilled in the art appreciates that the chafing stand can come in a variety of shapes and sizes depending on the need and comfort of the user. Further, many changes in the design and placement of components may take place without deviating from the scope of the presently disclosed chafing stand.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure.

What is claimed is:

1. A chafing stand, comprising:
    a base frame;
    leg frames placed apart from one another, wherein said leg frames connect at distal ends of said base frame via T-shaped members, wherein each of said leg frames comprises a connecting bar and U-shaped member, wherein said U-shaped members extend outwardly from said connecting bars, and wherein said connecting bars draw through said T-shaped members;
    poles extending from distal ends of each leg frame of said leg frames;
    wherein a handle is connected to said leg frames and wherein said handle does not extend past a height of the U-shaped members when the leg frames are collapsed;

wherein a top frame comprises a rectangular frame having pole receiving sections extending downwards facing said poles, and wherein said pole receiving sections are configured to receive said poles, wherein said U-shaped members act as base legs for said chafing stand, wherein said poles position perpendicularly to said base frame, wherein said pole receiving sections connect to said poles, wherein said top frame receives a tray comprising a dish, wherein said base frame receives a heating member for chafing said dish, and wherein said top frame is configured to be removed and said poles are configured to be collapsed over said base frame when not in use such that said U-shaped members position upwards from said connecting bar.

2. The chafing stand of claim 1, wherein said base frame comprises a heater support member, and wherein said heater support member receives said heating member.

3. The chafing stand of claim 1, wherein each of said leg frames comprises a ring member for carrying said base frame or said chafing stand.

4. The chafing stand of claim 1, wherein each pole receiving section of said pole receiving sections comprises a hole for receiving a pole of said poles.

5. A method of providing a chafing stand for chafing dish, said method comprising the steps of:
providing a base frame;
providing leg frames placed apart from one another, said leg frames being connected at distal ends of said base frame via T-shaped members, each of said leg frames comprising a connecting bar and U-shaped members, said U-shaped members extending outwardly from said connecting bar, said connecting bar drawing through said T-shaped member;
providing poles extending from distal ends of each leg frame of said leg frames;
providing a handle connected to said leg frames wherein said handle does not extend past a height of the U-shaped members when the leg frames are collapsed;
providing a top frame, said top frame comprising a rectangular frame having pole receiving sections extending downwards facing said poles, said pole receiving sections configured for receiving said poles;
positioning said poles perpendicularly to said base frame while said U-shaped members act as base legs for said chafing stand;
connecting said poles to said pole receiving sections;
receiving a tray comprising a dish at said top frame;
receiving a heating member at said base frame for chafing said dish; and
removing said top frame and collapsing said poles over said base frame when not in use such that said U-shaped members position upwards from said connecting bar.

6. The method of claim 5, further comprising:
providing a heater support member at said base frame; and
receiving said heating member over said heater support member.

\* \* \* \* \*